United States Patent
Thayer et al.

(10) Patent No.: US 11,196,759 B2
(45) Date of Patent: Dec. 7, 2021

(54) SIEM SYSTEM AND METHODS FOR EXFILTRATING EVENT DATA

(71) Applicant: MICROSOFT TECHNOLOGY LICENSING, LLC, Redmond, WA (US)

(72) Inventors: Peter A. Thayer, Woodinville, WA (US); Jagannathan Deepak Manohar, Redmond, WA (US); Jason Matthew Conradt, Monroe, WA (US); Karthik Selvaraj, Kirkland, WA (US); Donald J. Ankney, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 250 days.

(21) Appl. No.: 16/453,462

(22) Filed: Jun. 26, 2019

(65) Prior Publication Data
US 2020/0412751 A1 Dec. 31, 2020

(51) Int. Cl.
*H04L 29/06* (2006.01)
*G06F 21/31* (2013.01)

(52) U.S. Cl.
CPC .......... *H04L 63/1425* (2013.01); *H04L 63/20* (2013.01)

(58) Field of Classification Search
CPC . H04L 63/1425; H04L 63/20; H04L 63/1416; H04L 63/1433; H04L 63/1408;
(Continued)

(56) References Cited

U.S. PATENT DOCUMENTS 9,256,739 B1 * 2/2016 Roundy .............. H04L 41/0631
9,654,485 B1 5/2017 Neumann
(Continued)

OTHER PUBLICATIONS

Le et al., "Logical Network Mapping With Content Connectivity Against Multiple Link Failures in Optical Metro Networks," 2019 IEEE International Conference on Advanced Networks and Telecommunications Systems (ANTS) Year: 2019 | Conference Paper | Publisher: IEEE.*

(Continued)

*Primary Examiner* — Roderick Tolentino
(74) *Attorney, Agent, or Firm* — Shook, Hardy & Bacon L.L.P.

(57) ABSTRACT

Embodiments provide for a security information and event management (SIEM) system utilizing distributed agents that can intelligently traverse a network to exfiltrate data in an efficient and secure manner. A plurality of agent devices can dynamically learn behavioral patterns and/or service capabilities of other agent devices in the networking environment, and select optimal routes for exfiltrating event data from within the network. The agent devices can independently, selectively, or collectively pre-process event data for purposes of detecting a suspect event from within the network. When a suspect event is detected, agent devices can select a target device based on the learned service capabilities and networking environment, and communicate the pre-processed event data to the target device. The pre-processed event data is thus traversed through the network along an optimal route until it is exfiltrated from the network and stored on a remote server device for storage and further analysis.

20 Claims, 5 Drawing Sheets

(58) Field of Classification Search
CPC .. G06F 21/554; G06F 21/577; H04W 12/088; H04W 12/122; H04W 12/128
See application file for complete search history.

(56) References Cited

U.S. PATENT DOCUMENTS

| | | | |
|---|---|---|---|
| 10,205,593 B2 | 2/2019 | Biesinger et al. | |
| 2002/0147915 A1* | 10/2002 | Chefalas | G06F 21/56 713/188 |
| 2013/0103785 A1* | 4/2013 | Lyon | H04N 21/2385 709/217 |
| 2015/0172300 A1 | 6/2015 | Cochenour | |
| 2015/0188949 A1 | 7/2015 | Mahaffey et al. | |
| 2015/0220735 A1* | 8/2015 | Paithane | G06F 21/53 726/23 |
| 2016/0078229 A1* | 3/2016 | Gong | H04L 63/1416 726/24 |
| 2016/0212480 A1* | 7/2016 | Dangy-Cave | H04N 21/43615 |
| 2016/0262186 A1* | 9/2016 | Lee | H04W 4/70 |
| 2017/0171240 A1* | 6/2017 | Arzi | G06F 21/566 |
| 2017/0244748 A1* | 8/2017 | Krause | H04L 63/1425 |
| 2018/0060496 A1 | 3/2018 | Bulleit et al. | |
| 2018/0248701 A1 | 8/2018 | Johnson et al. | |
| 2019/0044976 A1 | 2/2019 | Smith | |
| 2019/0073244 A1 | 3/2019 | Fung | |
| 2019/0109796 A1* | 4/2019 | Chehaibar | H04L 1/1864 |
| 2019/0132350 A1 | 5/2019 | Smith et al. | |
| 2019/0149429 A1 | 5/2019 | Stocker | |

OTHER PUBLICATIONS

Hmaity et al., "Survivable virtual network mapping to provide content connectivity against double-link failures," 2016 12th International Conference on the Design of Reliable Communication Networks (DRCN) Year: 2016 | Conference Paper | Publisher: IEEE.*

"Blockchain", Retrieved from: https://en.wikipedia.org/wiki/Blockchain, Retrieved Date: Nov. 13, 2019, 16 Pages.

"Pay Attention to These 4 Types of Blockchain Business Initiatives", Retrieved from: https://www.gartner.com/en/documents/3868969/pay-attention-to-these-4-types-of-blockchain-business-in0, Mar. 19, 2018, 3 Pages.

Vanian, Jonathan, "Even Kodak—Yes, Kodak—Wants to Join the Cryptocurrency Boom", Retrieved from: https://fortune.com/2018/01/09/kodak-cryptocurrency-blockchain-kodakcoin/, Jan. 9, 2018, 2 Pages.

"2017 Cost of Data Breach Study: Global Overview" In Research Report of Ponemon Institute, Jun. 2017, 35 Pages.

"Security Information and Event Management—Wikipedia", Retrieved From: https://en.wikipedia.org/wiki/Security_information_and_event_management, Retrieved on: Jan. 18, 2021, 5 Pages.

"International Search Report and Written Opinion Issued in PCT Application No. PCT/US2020/032447", dated Jun. 25, 2020, 9 Pages.

* cited by examiner

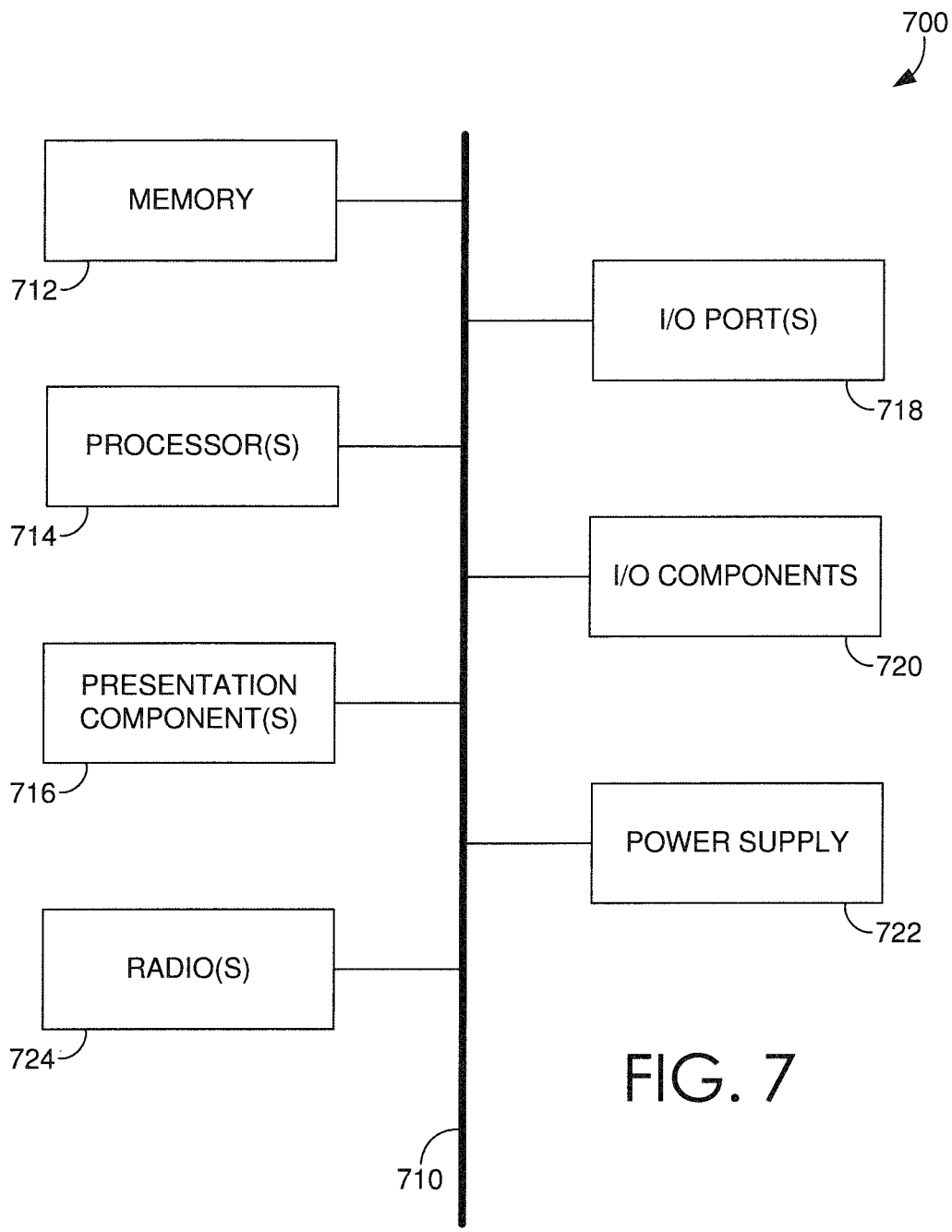

SIEM SYSTEM AND METHODS FOR EXFILTRATING EVENT DATA

BACKGROUND

In the world of computing technologies, threats of cyber-security attacks continue to grow, particularly as the world becomes increasingly reliant on computers and network communications. A variety of security information and event management (SIEM) solutions are available on the market, facilitating real-time analysis of event logs that can be generated by applications or network hardware, among other things. SIEM solutions generally combine aspects of security information management (SIM) and security event management (SEM), for aggregating event data from many sources of a network (e.g., servers, databases, applications, hardware), correlating aggregated event data to identify meaningful information, conducting forensic analyses on aggregated event data to detect suspect events, and/or alerting administrators, among other things.

SUMMARY

Embodiments of the present disclosure generally relate to a SIEM solution that facilitates exfiltration of event data from within a secured network. More specifically, embodiments describe systems and techniques for securely and efficiently exfiltrating event data associated with suspect events detected from within a segmented or unsegmented network.

At a high level, a secured network, such as one associated with an organization or entity, can include a plurality of agent devices operable to generate event data, such as the event data that may be relevant to a SIEM solution. The network can be structured to include any number of segments (i.e., subnets), whereby some agent devices may be able to directly exfiltrate event data from the network (e.g., to a remote SIEM server device external the network), while other agent devices may not be able to directly exfiltrate the network. In accordance with various embodiments, each agent device can generate and store event data and effectively "pre-process" stored event data for purposes of detecting potentially-suspect behavior (e.g., abnormal usage, failure). The agent device can, among other things, determine "normal" behavioral patterns from the stored event data (e.g., event logs), generate behavioral pattern rules based on the determined "normal" behavioral patterns, and detect suspect events based on an analysis of further generated and/or further stored event data in view of the generated behavioral pattern rules. In some embodiments, the agent device can generate an event dataset based on a detected suspect event, whereby the event dataset can include any of event data determined relevant to the detected suspect event, generated analysis data (e.g., analysis logs) associated with the detected suspect event, and/or any other electronic information or event data relevant to the detected suspect event. In some aspects, the generated event dataset can be compressed. In this regard, the generated event dataset includes pre-processed event data.

In accordance with further embodiments described herein, each agent device can automatically determine a set of its own capabilities (e.g., ability to exfiltrate the network, available CPU bandwidth, available storage space, idle state), automatically learn its neighborhood (e.g., a set of other agent devices in communication therewith and capabilities thereof), and select a target device (e.g., a SIEM server device external the network, another agent device) to communicate generated event dataset(s) to. In this regard, if a SIEM server device external to the network is selected as the target device, the generated event dataset is effectively exfiltrated from the network for storage and/or further analysis by the SIEM server device. However, if another agent device is selected as the target device, the other agent device can receive the generated event dataset, select a corresponding target device, and communicate the generated event dataset to the selected corresponding target device. The process can continue until the SIEM server device is ultimately selected as the target device by one of the agent devices, such that the generated event dataset is effectively exfiltrated from the network and communicated to the SIEM server device for storage and/or further analysis.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing figures, wherein:

FIG. 7 is a block diagram of an exemplary computing environment suitable for use in implementing some embodiments of the present disclosure.

DETAILED DESCRIPTION

Figure 1:
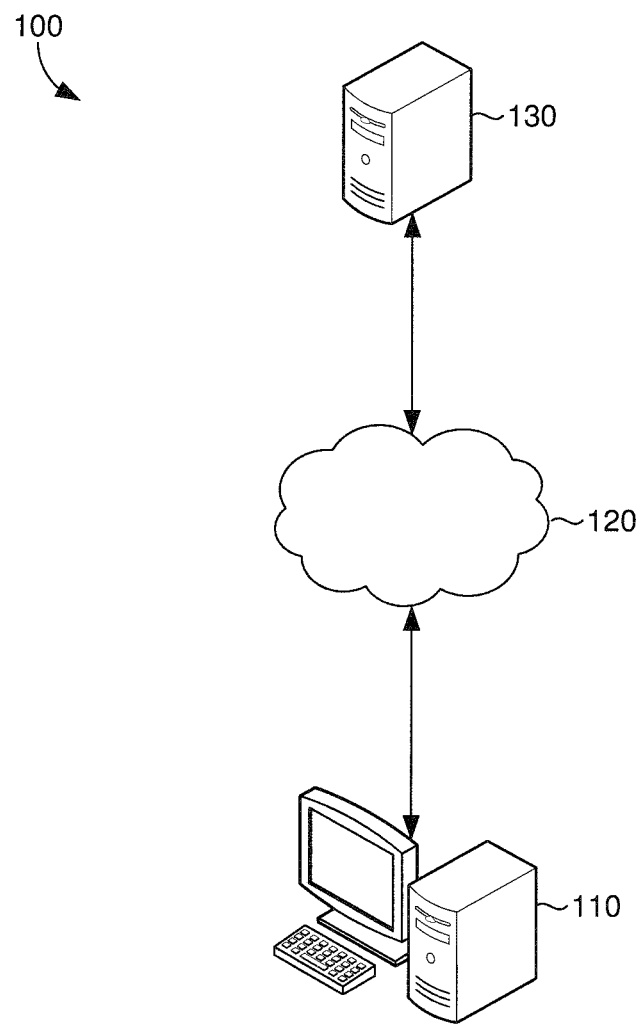
FIG. 1 is an exemplary operating environment in accordance with some embodiments of the present disclosure.

Conventional SIEM solutions have generally been successful for purposes of decreasing remediation and response times in the event of a security breach, but each conventional solution has its shortcomings. SIEM solutions of the appliance variety (e.g., SIEM hardware devices) can be very effective, but have generally been known to have difficulty scaling to the storage and analytical needs of thousands of end-points (e.g., computing devices, networking hardware) and their attendant security infrastructure, such as intrusion prevention systems, proxy servers, mail gateways, and the like. Cloud-based SIEM solutions, on the other hand, are generally known to be scalable in the aspects of both CPU load and data management, while offering a much simpler solution for maintenance over SIEM appliances. However, as well-designed security network architectures are typically segmented (e.g., having strict traffic controls between network segments), a cloud-based SIEM solution is generally unable to collect the data it needs from devices it cannot communicate with (i.e., from a network segment removed from the Internet). Typically, a SIEM appliance or other security monitoring application would sit on a network segment lacking Internet connectivity. While cloud-based SIEM solutions could employ a VPN to complete this gap, numerous connections to secure networks could potentially expose the SIEM service supplier (i.e., the cloud-based SIEM solution provider) to substantial liability should the SIEM service supplier's network be breached.

Moving on, the industry then developed a "hybrid SIEM," which attempts to solve the issues relating to both data management and data exfiltration from within a segmented network. Unlike purely appliance-based or cloud-based SIEM solutions, a hybrid SIEM solution generally utilizes both cloud-based services with SIEM appliances. Yet, the issue of managing SIEM appliances remains unresolved. Moreover, hybrid SIEM solutions require tight release version coupling between the versions running for all customers on the cloud, and the appliances running on each customer premises. While the cloud-based portion of the hybrid SIEM solution can alleviate issues relating to data management, the synchronization of releases across SIEM appliances becomes an inherently new issue.

Embodiments described herein are directed to resolving the above-noted issues relating to conventional SIEM solutions. At a high level, systems and techniques are described for utilizing agent devices that can effectively pre-process (e.g., collect, aggregate, validate, verify) event data from within a network, whether segmented or unsegmented, and collectively exfiltrate the pre-processed event data to a remote SIEM server (e.g., a cloud device) that handles aspects relating to data management, analysis, and administration, among other things.

In various embodiments, a secured network, such as one associated with an organization or entity, can include a plurality of agent devices operable to generate event data. The network can be structured to include any number of segments (i.e., subnets), whereby some agent devices may be able to directly exfiltrate event data from the network (e.g., to a remote SIEM server device external the network), while other agent devices may not be able to directly exfiltrate the network. An agent device on the network can automatically determine a set of capabilities (e.g., ability to exfiltrate the network, available CPU bandwidth, available storage space, idle state) associated with the agent device. The agent device can generate a connectivity configuration associated with the agent device based on the determined set of capabilities. The agent device can also exchange a plurality of electronic message broadcasts with one or more other agent device(s) in the network, or a segment of the network associated with the agent device. In embodiments, each electronic message that is generated and broadcast by an agent device can include an identifier and a generated connectivity configuration associated with the agent device. As such, the agent device can update (or in other words, continue to generate) a connectivity configuration associated with the agent device, dynamically, based on the exchanged plurality of electronic message broadcasts.

In some embodiments, a generated connectivity configuration can include one or more of: a determined result of a performed attempt by the agent device to exfiltrate the network (e.g., access a remote server device), a determined indication that the agent device can communicate with another agent device that can provide a path (i.e., is in a set of other agent devices through which communications can be relayed) to exfiltrate the network, and a determined number of hops (e.g., within the network) required to exfiltrate the network (e.g., if the agent device was to serve as a relay in a corresponding path). In some further embodiments, a neighborhood map associated with the agent device can be generated (and updated) based on the connectivity configuration(s) of the one or more other agent devices included in a portion of the exchanged electronic message broadcasts received by the agent device. In some aspects, the generated neighborhood map includes a set of identifiers, each identifier being associated with another agent device with which one or more electronic message broadcasts were exchanged, and the connectivity configuration associated with the other agent device.

In various embodiments, the agent device can generate a plurality of event logs (e.g., event data) associated with one or more processes and/or applications executing thereon. In some embodiments, the generated plurality of event logs can be stored in a memory of the agent device. In some further embodiments, the agent device can store the generated plurality of event logs, with an identifier associated with the agent device, onto a distributed ledger (e.g., a blockchain) collectively maintained and stored by each of the agent device and any one or more other agent device(s) within the network and/or the generated neighborhood map. In this way, if event logs (e.g., event logs associated with a breach activity) are deleted from one agent device, the event logs can still be stored in the distributed ledger maintained and stored by each other agent device(s).

In some aspects, a first set of generated event logs can be limited to a period of time. Preferably, the first set of generated event logs corresponds to a period of "normal" activity associated with the agent device. In other words, the period of "normal" activity can correspond to a period of time in which the agent device was being utilized under normal circumstances, and without concerns of a security breach. In some further aspects, a second set of generated event logs can correspond to event logs generated by the one or more processes and/or applications after the first set of generated event logs has been stored in the memory of the agent device and/or the distributed ledger.

In various embodiments, the agent device can determine behavioral patterns of one or more processes and/or applications executed or executing on the agent device based on the stored first set of event logs. More so, the agent device can generate a set of behavioral pattern rules that define, in essence, a pattern of normal behavior of the agent device (e.g., the processes or applications thereof) based on the determined behavioral patterns of the agent device. In this way, the agent device can detect a suspect event (i.e., an abnormal behavior) utilizing the second set of generated event logs based on the generated set of behavioral pattern rules. In some embodiments, the agent device can store the generated set of behavioral pattern rules with an identifier associated with the agent device to the distributed ledger.

In some further embodiments, as the first set of generated event logs associated with the agent device can be stored on the distributed ledger, any one or more of the other agent devices within the generated neighborhood map can determine behavioral patterns of the agent device based on the first set of event logs and the identifier of the agent device stored on the distributed ledger, generate the set of behavior pattern rules associated with the agent device based on the determined behavioral patterns, and detect a suspect event utilizing the second set of generated event logs stored on the distributed ledger based on the generated set of behavioral pattern rules. Similarly, in some embodiments, the other agent device can store the generated set of behavioral pattern rules with the identifier associated with the agent device to the distributed ledger. In this way, the agent device or one or more other agent devices in the network can employ the stored set of behavioral pattern rules associated with the agent device to detect a suspect event associated with the agent device.

In various embodiments, the agent device, or another agent device, can analyze the second set of generated event logs associated with the agent device against the stored set of behavioral pattern rules associated with the agent device, to detect the occurrence of a suspect event associated with the agent device. In some aspects, performance of the analysis can cause the generation of analysis output data associated with the agent device to be stored in the memory and/or on the distributed ledger. In this way, the agent device or any other agent device can "pick up" or continue the analysis if yet to be completed by another agent device. In some embodiments, the analysis is preferably stopped by an agent device when awoken from an idle state, and performed or "picked up" by an agent device that is in an idle state. In this way, computing resources (e.g., memory, processing power) of agent devices within the network can be optimally utilized without impacting performance of the analysis and/or other operations being performed when awoken from the idle state.

In various embodiments, based on the agent device detecting a suspect event associated with the agent device or another agent device, the agent device can generate an event dataset associated with the detected suspect event. In some embodiments, the agent device can parse the second set of event logs to extract therefrom one or more event logs that are relevant to the detected suspect event. In some aspects, the one or more relevant event logs can be compressed (e.g., parsed) based on a defined template associated with the one or more processes, applications, or the agent device identifier. In some further aspects, the defined template can be stored in the memory of each agent device, or stored in the distributed ledger maintained by each agent device. In even further aspects, the generated analysis output data associated with the detected suspect event can be compressed (e.g., parsed) from the stored analysis output data.

In various embodiments, the agent device can select a target device from the one or more other agent device(s) within the network. The target device can be selected as a recipient of the generated event dataset based on the connectivity configuration associated with the agent device and/or the connectivity configurations associated with the other agent device(s) in the generated neighborhood map associated with the agent device. In an example, based on a determination that the connectivity configuration associated with the agent device indicates that the agent device can exfiltrate the network, the agent device can select a remote server device (e.g., a cloud-based SIEM server outside of the network) as the target device. In another example, based on a determination that the connectivity configuration associated with the agent device indicates that the agent device cannot exfiltrate the network, but that one or more of the other agent devices can provide a path to exfiltrate the network, the agent device can select one of the agent devices, which can both provide the path and is associated with a lowest determined hop count, as the target device. In some embodiments, additional factors can be considered in addition or as an alternative to the lowest determined hop count when selecting the target device. For instance, in embodiments where some other determined capabilities (e.g., available CPU bandwidth, available storage space, idle state) for each other agent device is also included in the generated neighborhood map, the agent device can select one of the other agent devices as the target device based on any combination of having a determined lowest hop count, a determined most available CPU bandwidth, a determined most available storage space, a determined positive idle state (i.e., the other agent device is idle), or any other determined capability of the other agent device.

As each other agent device in the network can perform the above-described features of an agent device, it is contemplated that any agent device in the network that is selected as a target device can receive and further communicate (i.e., relay) the event dataset to a corresponding selected target device until the event dataset is ultimately communicated to the remote server device for storage and/or further analysis thereby. It is also contemplated that while each agent device in the network may have its own corresponding one or more processes and/or applications executing thereon, each agent device can commonly employ the above-features described in relation to an agent device.

Turning now to FIG. 1, a schematic depiction is provided illustrating an exemplary operating environment 100 in which some embodiments of the present disclosure may be employed. It should be understood that this and other arrangements described herein with respect to any of the figures are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 depicted in FIG. 1 includes a plurality of agent devices, such as agent device 110, connected to an internal network (not shown). In some aspects, the network can be segmented, such that one or more agent devices can be in one network segment, while one or more other agent devices can be in one or more other network segments. At least one of the agent devices can directly exfiltrate the internal network to communicate with a remote server device 130 outside of the internal network via an external network 120, such as the Internet. In various embodiments, the internal network can include one or more networks including, but not limited to, LANs, PANs, wireless networks, wired networks, and the like, while the external network can include one or more networks including, but not limited to, the Internet, WANs, telecommunication networks, and the like.

Figure 2:
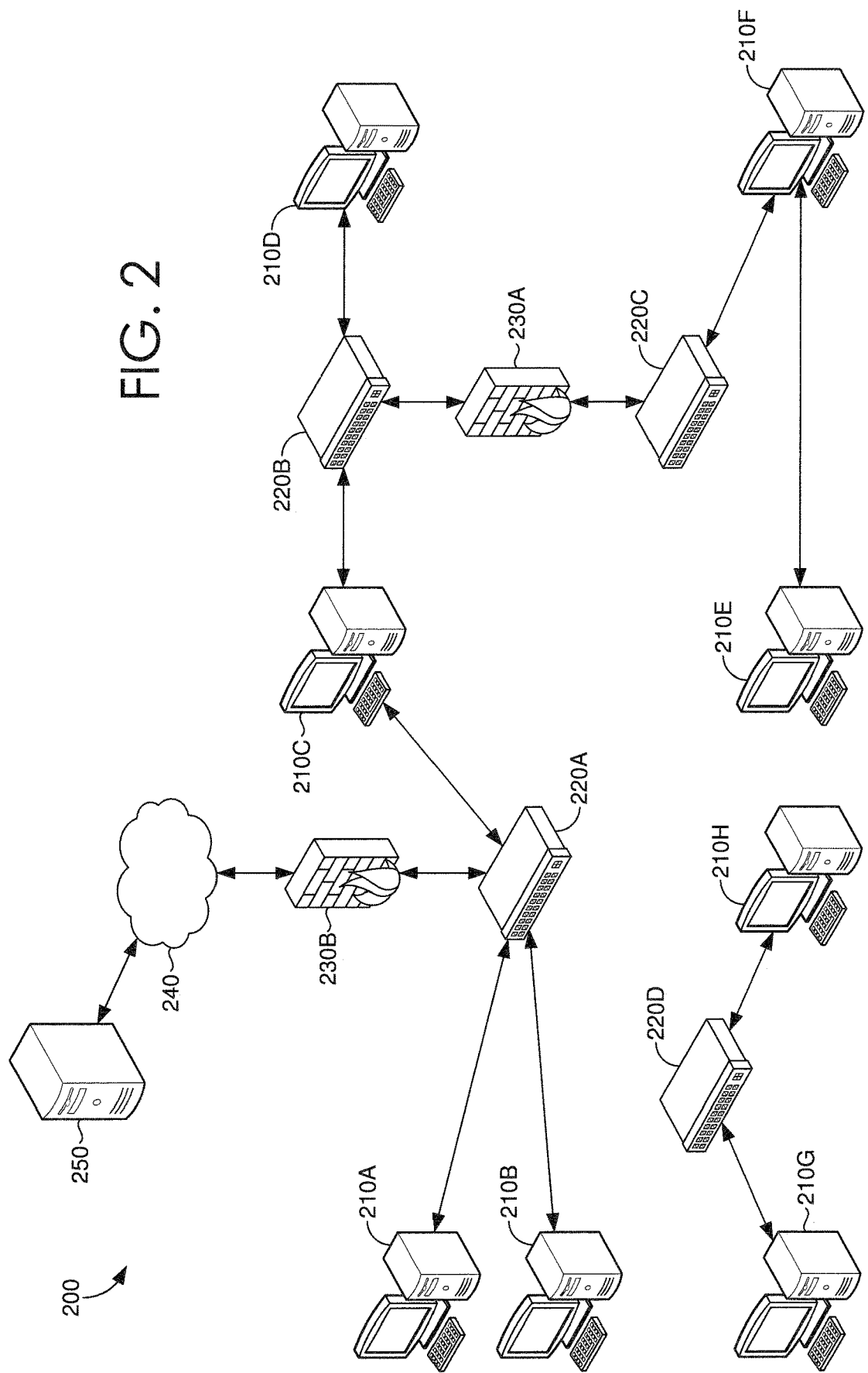
FIG. 2 is an exemplary system diagram in accordance with some embodiments of the present disclosure.

Looking now to FIG. 2, a schematic depiction is provided illustrating an exemplary system 200 in which some embodiments of the present disclosure may be employed. It is noted the following description is provided merely as an example system having an exemplary networking infrastructure, both of which are not intended to be limiting. The exemplary system 200 includes a plurality of agent devices 210A-210H (e.g., agent device 110 of FIG. 1), a plurality of gateway devices 220A-220D, and a plurality of firewalls 230A-230B (e.g., a firewall appliance or software within a corresponding gateway device), each inside of an internal network, such as the internal network described in accordance with FIG. 1. Also depicted is an external network 240 (e.g., external network 120 of FIG. 1), and a remote server device 250 (e.g., remote server device 130 of FIG. 1). As will be described hereinafter, the internal network will be referred to as "a network" or "the network" while any communications from within the network can be communicated to the remote server device 250 via the external network 240 (e.g., the Internet).

As depicted, the exemplary system 200 demonstrates how the network can be segmented, and agent devices 210A-210H can be partially or completely removed from the external network 240. For instance, agent devices 210A-210C can be in direct communication to one another, as each is coupled to a first gateway device 220A. As such, it is contemplated that agent devices 210A-210C are each associated with a first segment of the network. Assuming any of agent devices 210A-210C can directly exfiltrate the network (e.g., communicate with remote server device 250) through the first gateway device 220A and firewall 230B, each of these agent devices 210A-210C can be considered both a gateway agent device having a zero (0) hop count, and a path agent device. For purposes of description, a gateway agent device is an agent device that can directly exfiltrate the network and access external network 240, while a path agent device is an agent device that can relay communications to and/or from the remote server device 250, directly, or indirectly through one or more agent devices of the network. In accordance with various embodiments described herein, any agent device that is a gateway agent device is also a path agent device. Moreover, as an agent device that is a gateway agent device can directly exfiltrate the network, the agent device is also considered to have an associated hop count of zero (0).

Also depicted in the exemplary system 200 are agent devices 210C-210D coupled to a second gateway device 220B. In this regard, it is contemplated that agent devices 210C-210D are each associated with a second segment of the network, where agent device 210C is associated with both the first and second segments. While agent device 210C is a gateway agent device and a path agent device, agent device 210D is one step removed from the remote server device 250, as communications from agent device 210D to remote server device 250 would have to pass through agent device 210C. As such, agent device 210D has a hop count of one (1), which is in essence, the hop count of agent device 210C incremented by one (1). Also, by virtue of the ability for communications from agent device 210D to be communicated to a path agent device (e.g., agent device 210C), agent device 210D is also considered a path agent device.

Also depicted are agent devices 210E-210F, where agent device 210E is coupled to agent device 210F, and agent device 210F is coupled to a third gateway device 220C. Thus, it is contemplated that agent device 210F, associated with a third segment of the network, is also one step removed from the remote server device 250, as communications from agent device 210F to remote server device 250 would have to pass through agent device 210C. Similar to agent device 210D, agent device 210F is also considered a path agent device, having a hop count of one (1), which is again, the hop count of agent device 210C incremented by one (1). On the other hand, agent device 210E is further removed from the remote server device 250, though communications from agent device 210E to remote server device 250 could pass through agent device 210F. In this regard, agent device 210E is considered a path agent device, having a hop count of two (2), which is the hop count of agent device 210F incremented by one (1).

Lastly, agent devices 210G-210H are also depicted in the exemplary system 200, each coupled to a third gateway device 220D. Each of agent devices 210G-210H are associated with a third segment of the network, though neither agent device 210G, 210H can communicate with the remote server device 250 or a path agent device, such as agent devices 210A-210F. In this regard, neither one of agent devices 210G-210H is a gateway agent device, or a path agent device. Following, each of agent devices 210G-210H can thus have a hop count of null (e.g., no value) or other indefinite value (e.g., infinity), by way of example, as neither agent device can directly or indirectly exfiltrate the network and/or communicate with the remote server device 250.

Figure 3:
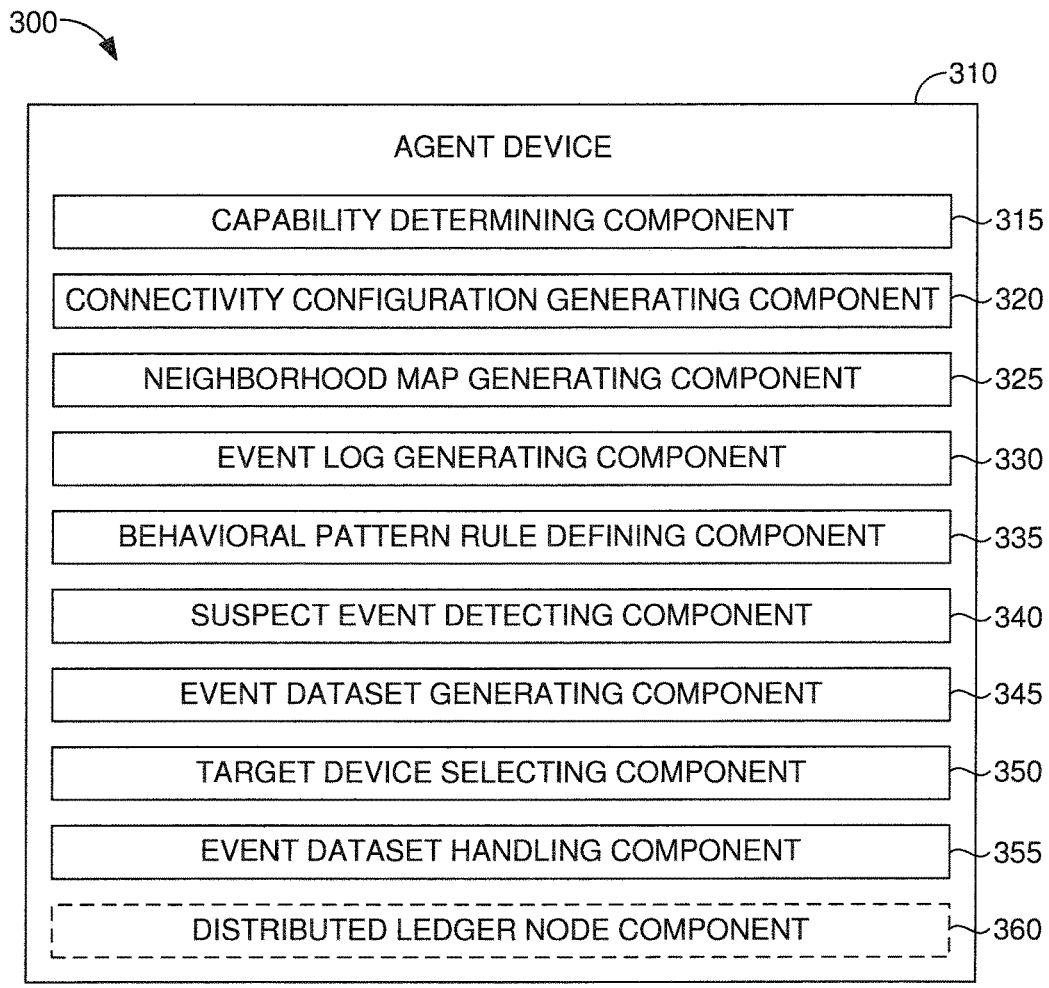
FIG. 3 is a block diagram depicting an exemplary agent device in accordance with some embodiments of the present disclosure.

Referring now to FIG. 3, a block diagram 300 is provided depicting an exemplary agent device 310, such as agent device 110 of FIG. 1 or any of agent devices 210A-210H of FIG. 2, in accordance with some embodiments of the present disclosure. In some embodiments, the agent device 310 can be associated with a unique identifier, which can be encoded into hardware and/or software, and/or stored in a memory, of the agent device 310. For purposes of clarity, any agent device on the network can include the components described herein with respect to agent device 310.

In accordance with various embodiments, an agent device 310 can include at least one computing device described in accordance with FIG. 7. The agent device 310 can further include, among other things, any one or more of a capability determining component 315, a connectivity configuration generating component 320, a neighborhood map generating component 325, an event log generating component 330, a behavioral pattern rule defining component 335, a suspect event detecting component 340, an event dataset generating component 345, a target device selecting component 350, and an event dataset handling component 355. In some embodiments, agent device 310 can also include a distributed ledger node component 360.

In some embodiments, a capability determining component 315 can automatically determine a set of capabilities associated with the agent device 310. For instance, in an embodiment, the capability determining component 315 can determine an ability to directly exfiltrate the network. Determining the ability to directly exfiltrate the network (e.g., the internal network behind firewall 230B of FIG. 2) can include performing an attempt to directly communicate with a remote server device, such as remote server device 250 of FIG. 2. The attempt can include sending a ping request, logging in, or any other method of accessing the remote server device outside of the network. In a further embodiment, the capability determining component 315 can determine one or more of an available CPU bandwidth (e.g., available processing power), available storage space (e.g., on a local memory device), or an idle state of the agent device 310, among other things. In some aspects, the available CPU bandwidth can be determined based on an average amount of available CPU bandwidth calculated over a defined period of time (e.g., 60 minutes, 24 hours, 7 days). It is contemplated that any of the foregoing capabilities can be determined over such a defined period of time, and can be updated periodically over any other defined period of time (e.g., 60 minutes, 24 hours, 7 days).

In some embodiments, a connectivity configuration generating component 315 can generate and store (e.g., in a memory of agent device 310) a connectivity configuration associated with the agent device 310 based on, among other things, the determined set of capabilities. The generated connectivity configuration can include a set of fields that can be populated by the capability determining component 315, whereby each field includes a value that corresponds to one of the determined set of capabilities. In this regard, a connectivity configuration can be generated by an agent device once the set of capabilities is determined. In some embodiments, the generated connectivity configuration can include fields such as [{gateway agent device} ][ {path agent device}][{hop count}], where each field can include a representative value (e.g., binary code, flag, hex code, alphanumeric text) of whether: the agent device 310 is a gateway agent device based on the determined ability to directly exfiltrate the network; a determination that the agent device 310 is a path agent device; and a determined hop count associated with the agent device 310. By way of non-limiting example, in accordance with some embodiments, the first connectivity configuration generated by agent device 210A of FIG. 2, can be represented with binary values as [1][1] [00000000], as agent device 210A is considered a gateway agent device and a path agent device associated with a hop count of zero (0). In some further embodiments, the generated connectivity configuration can include additional fields, such as [{available CPU bandwidth}], [{available storage space}], [{idle state} ], or any other determinable capability associated with the agent device 310. It is contemplated that any combination of the above-described fields can be included in the generated connectivity configuration, though each agent device in the network preferably generates a corresponding connectivity configuration having the same combination of fields, while the field values for each agent device can be different based on the determined capabilities of the agent device. As described herein, an agent device, such as agent device 310, is considered a gateway agent device based on a determination that the agent device can directly exfiltrate the network. More so, an agent device that is a gateway agent device, is also considered a path agent device, and is also associated with a hop count of zero (0).

The connectivity configuration component 320 can continue to generate (or in other words, update) and store the connectivity configuration associated with the agent device 310 based on electronic message broadcasts exchanged between the agent device 310 and other agent devices on the network or network segment of the agent device 310. In some embodiments, the connectivity configuration generation component 320 can generate and broadcast, to the network or network segment of the agent device 310, an electronic message that includes the identifier associated with the agent device 310 and the generated connectivity configuration associated with the agent device 310. In some aspects, the generated electronic message can be a UDP broadcast.

In some further embodiments, the connectivity configuration generation component 320 can receive electronic messages generated and broadcasted by one or more other agent devices on the network or network segment of the agent device 310. As each other agent device, like agent device 310, can generate and store a corresponding connectivity configuration, the corresponding connectivity configuration of the other agent device can be included in one or more electronic messages generated and broadcasted by the other agent device. In some embodiments, the agent device 310 can generate and broadcast an electronic message including the generated connectivity configuration periodically and/or in response to receiving another electronic message broadcasted by another agent device.

As electronic message are exchanged (i.e., broadcasted and received) between the agent device 310 and one or more other agent devices, the agent device can continue to generate (or in other words, update) and store the connectivity configuration associated with the agent device 310 based on the exchanged plurality of electronic messages. Similarly, a neighborhood map generating component 325 can generate (and update) a neighborhood map associated with the agent device 310 based on electronic messages received from other agent devices. The neighborhood map can include, among other things, an identifier and connectivity configuration for each other agent device from which an electronic message was received. In this way, the neighborhood map generating component 325 can facilitate the automatic learning of which one or more agent devices, and corresponding set of capabilities thereof, operable to directly communicate with the agent device 310. In some aspects, the one or more agent devices that can directly communicate with the agent device 310 can be in the network or network segment associated with the agent device 310. These one or more other agent devices that can directly communicate with the agent device 310 is sometimes referred to herein as a "neighborhood" of the agent device 310.

As was noted above, capability determining component 315 can determine that an agent device, such as agent device 310, is a gateway agent device based on a determination that the agent device can directly exfiltrate the network. As an agent device that is determined a gateway agent device is also a path agent device having a hop count of zero (0), the connectivity configuration generating component 320 can store a result of these determinations (e.g., gateway agent device, path agent device, hop count) in the connectivity configuration associated with the agent device.

If, however, an agent device, such as agent device 310, is not a gateway agent device (i.e., cannot directly exfiltrate the network), but connectivity configuration generation component 320 determines that at least one other agent device in the generated neighborhood map is a path agent device, the connectivity configuration generation component 320 can determine that the agent device 310 is also a path agent device and update the connectivity configuration associated with agent device 310 accordingly. Further, the connectivity configuration generation component 320 can determine the hop count of the path agent device based on the connectivity configuration associated with the path agent device included in the generated neighborhood map, and further update the connectivity configuration associated with agent device 310 with the hop count of the path agent device incremented by a value of one (1).

In various embodiments, each time the connectivity configuration of agent device 310 is generated (or updated), the agent device 310 can generate and broadcast another electronic message that includes the generated (or updated) connectivity configuration of the agent device 310. In this way, each agent device on a network or network segment can auto-learn their network neighborhood (i.e., agent devices in direct communication with the agent device) and set of capabilities of agent devices in their network neighborhood, represented in a neighborhood map generated by the agent device.

In some embodiments, if an agent device, such as agent device 310 is not a gateway agent device (e.g., based on the determined set of capabilities), but the connectivity configuration generation component 320 determines that a plurality of other agent devices included in the generated neighborhood map are path agent devices, the connectivity configuration generation component 320 can determine that the agent device 310 is also a path agent device and update the connectivity configuration associated with agent device 310 accordingly. Further, the connectivity configuration generation component 320 can determine that one or more of the plurality of path agent devices, included in the generated neighborhood map, is associated with a lowest hop count (e.g., based on a comparison or ranking of the associated hop counts). In this way, the configuration generation component 320 can update the connectivity configuration associated with agent device 310 utilizing the determined lowest hop count incremented by a value of one (1).

To this end, the agent device 310 can continue to generate (i.e., update) the connectivity configuration and neighborhood map associated with the agent device 310 based on electronic messages periodically and/or responsively exchanged with other agent devices. It is contemplated that, in some embodiments, that after a predefined number of messages exchanged with other agent device(s) reflects no changes to the associated connectivity configuration or neighborhood map, the agent device 310 can determine that the associated connectivity configuration or neighborhood map are completed, and the agent device can cease the broadcasting of electronic messages. It is further contemplated that in some embodiments, the agent device 310 can periodically broadcast electronic messages even after the associated connectivity configuration or neighborhood map are completed, to determine whether the neighborhood (i.e., the one or more other agent devices that agent device 310 can directly communicate with) has changed, so that the associated connectivity configuration or neighborhood map can be dynamically updated to account for changes in the neighborhood of the agent device 310.

In some embodiments, the agent device 310 can include an event log generating component 330. The event log generating component 330 can include or be associated with one or more operations, such as processes, applications, services (e.g., application, network), or login procedures, which are executed or can be executed by the agent device 310. In essence, the event log generating component 330 can generate one or more event logs (e.g., event data) for any of the one or more operations, and store the generated event log(s) in a memory of the agent device 310. In some embodiments, the event log generating component 330 can store the generated event log(s) with an identifier associated with the agent device onto a distributed ledger (e.g., a blockchain) collectively maintained and stored by each of the agent device and any one or more other agent device(s) within the network or neighborhood of the agent device 310, as will be described with reference to distributed ledger node component 360. In this way, if event logs (e.g., event logs associated with a potential breach activity) are deleted from one agent device, the event logs can still be stored in the distributed ledger maintained and stored by other agent device(s).

In various embodiments, the event log generating component 330 can generate a first set of event logs, which in some further embodiments, can be limited to a defined period of time (e.g., a day, a week, a month, a year). In some embodiments, the first set of generated event logs corresponds to a period of "normal" activity associated with the agent device 310. In other words, the period of "normal" activity can correspond to a period of time in which the agent device was being utilized under normal circumstances, and without concerns of a security breach. In some further embodiments, the event log generating component 330 can generate a second set of generated event logs after the first set of generated event logs has been generated and stored in the memory of the agent device and/or the distributed ledger (e.g., with the associated identifier).

In some embodiments, a behavioral pattern rule defining component 335 can determine behavioral patterns of the agent device 310, or in essence the one or more operations executed or executing thereon, based on the stored first set of event logs. The behavioral pattern rule defining component 335 can generate a set of behavioral pattern rules that defines a pattern of a determined normal behavior of the agent device 310 based on the determined behavioral patterns of the agent device 310. In some embodiments, the behavioral pattern rule defining component 335 can store the generated set of behavioral pattern rules to a memory. In some other or further embodiments, the behavioral pattern rule defining component 335 can store the generated set of behavioral pattern rules and the identifier associated with the agent device to the distributed ledger with the identifier associated with the agent device 310.

In some embodiments, a suspect event detecting component 340 can detect a suspect event (i.e., an abnormal or suspect behavior) after a second set of event logs is generated and/or stored by the event log generating component 330. In some embodiments, the suspect event detecting component 340 can analyze the stored second set of event logs based on the generated set of behavioral pattern rules, and determine whether the stored second set of event logs are indicative of a threat (e.g., abnormal or suspect behavior). In some embodiments, as the suspect event detecting component 340 is analyzing the stored second set of event logs in view of the generated set of behavioral pattern rules, the suspect event detecting component 340 can generate a set of analytical output data, which can include statistical calculations, probability determinations, calculated averages, calculated standard deviations, one or more event logs, agent device identifier(s), event identifier(s), operation identifier(s), other pieces of electronic information that may be relevant to the analysis, or any combination thereof. In some further embodiments, the suspect event detecting component 340 can store the generated set of analytical output data in the memory of the agent device 310 or the distributed ledger (e.g., with the agent device identifier) as the analytical output data is being generated.

In accordance with some embodiments, as a first set of generated event logs associated with the agent device 310 can be stored on a distributed ledger, any one or more other agent devices within the neighborhood of the agent device 310 can determine behavioral patterns of the agent device 310 based on the first set of event logs and the identifier of the agent device 310 stored on the distributed ledger, generate the set of behavior pattern rules associated with the agent device based on the determined behavioral patterns, and detect a suspect event utilizing the second set of generated event logs stored on the distributed ledger based on the generated set of behavioral pattern rules. Similarly, in some embodiments, the other agent device can store the generated set of behavioral pattern rules with the identifier associated with the agent device 310 to the distributed ledger. In this way, the agent device 310 or one or more other agent devices in the network can employ the stored set of behavioral pattern rules associated with the agent device 310 to detect a suspect event associated with the agent device 310.

In accordance with some further embodiments, any one or more other agent devices within the neighborhood of the agent device 310 can analyze the stored second set of generated event logs associated with the agent device 310 based on the stored set of behavioral pattern rules associated with the agent device 310, for purposes of detecting a suspect event associated with the agent device 310. In some aspects, when another agent device is conducting an analysis of the stored second set of generated event logs associated with agent device 310, the other agent device can generate a set of analytical output data, as described herein. In some further embodiments, the other agent device can store the generated set of analytical output data onto the distributed ledger (e.g., with the agent device identifier associated with the agent device 310) as the analytical output data is being generated. In this way, at any point in time, any one of the agent device 310 or any other agent device in the neighborhood can "pick up" or continue the analysis, if for example, the analysis is yet to be completed. In some embodiments, an agent device, such as agent device 310, can stop performing the analysis based on the agent device being woken from an idle state. In turn, another agent device in the neighborhood that is in an idle state can continue to perform or "pick up" that analysis. In this way, computing resources (e.g., memory, processing power) of agent devices within the network can be optimally utilized without impacting performance of the analysis and/or other operations being performed when woken from an idle state.

In various embodiments, based on suspect event detecting component 340 detecting a suspect event associated with the agent device 310 or another agent device, an event dataset generating component 345 can responsively generate an event dataset that corresponds to the detected suspect event. In some embodiments, the event dataset generating component 345 can parse the second set of event logs to extract therefrom one or more event logs that are relevant to the detected suspect event. In some embodiments, the one or more relevant event logs can be parsed by event dataset generating component 345 based on a defined template associated with the one or more operations and/or the identifier of the agent device (associated with the detected suspect event). The defined template can be stored in the memory of each agent device, or stored in the distributed ledger maintained by each agent device, in accordance with some embodiments described herein. In this regard, the event dataset generating component 345 can "compress" any combination of the parsed relevant event log(s) associated with the detected suspect event by parsing it based on a determined relevance thereof to the detected suspect event. By way of a non-limiting example, as an agent device can generate many event logs that are not necessarily relevant to a detected suspect event, it is contemplated that only a subset of these event logs may be useful for behavioral analysis (e.g., by a remote server device). Thus, only the event logs that are determined relevant (e.g., having a unique identifier associated with a process associated with the suspect event, within a timeframe of the suspect event) can be parsed, thereby "compressing" the event logs based on relevance.

In some embodiments, the event dataset generating component 345 can parse generated analytical output data associated with the detected suspect event from the stored analytical output data. In this regard, the event dataset generating component 345 can also "compress" the analytical output data associated with the detected suspect event by parsing it based on a determined relevance thereof to the detected suspect event. By way of a non-limiting example, the generated analytical output data may include an average "log-in/log-out" (e.g., user login or logout events) histogram over a period of time with associated variances (e.g., "User X logs in between 7:38+−20 M-F and never on S-S"). Thus, log-in events outside this histogram may be relevant to indicate anomalies, which may or may not be indicative of malware activity. Thus, only the generated analytical output data that is determined relevant (e.g., having a unique identifier associated with a process associated with the suspect event, within a timeframe of the suspect event) can be parsed, thereby also "compressing" the generated analytical output data based on relevance.

In some embodiments, a target device selecting component 350 can select a target device as the intended recipient of the generated event dataset to be communicated from the agent device 310. In some embodiments, the target device can be selected based on the connectivity configuration associated with the agent device 310 and/or the generated neighborhood map associated with the agent device 310. In an example, the target device selecting component 350 can determine that the connectivity configuration associated with the agent device 310 indicates that the agent device 310 is a gateway agent device, and thus the target device selecting component 350 can select a remote server device (e.g., remote server device 250 of FIG. 2) as the target device. In another example, the target device selecting component 350 can determine that the connectivity configuration associated with the agent device 310 indicates that the agent device 310 is not a gateway agent device, but that one or more of the other agent devices in the neighborhood of agent device 310 is a path agent device. In this regard, the target device selecting component 350 can select one of the path agent devices having a determined lowest associated hop count as the target device.

In some embodiments, the target device selecting component 350 can consider additional factors in addition, or as an alternative, to a determined lowest hop count when selecting the target device from a plurality of path agent devices in the neighborhood of agent device 310. For instance, in embodiments where one or more other capabilities (e.g., available CPU bandwidth, available storage space, idle state) of each agent device, such as agent device 310, is included in each corresponding connectivity configuration, the target device selecting component 350 can select one of the plurality of path agent devices in the neighborhood as the target device based on any combination of hop count, available CPU bandwidth, available storage space, idle state (i.e., the other agent device is idle), or any other determined capability of a path agent device defined in the associated neighborhood map. As optimization and efficiency are some key benefits of the present disclosure, preferably a path agent device having one or more of a lowest hop count, most available CPU bandwidth, most available storage space, or in an idle state, can be selected as the target agent device. It is contemplated that any of the foregoing capabilities can be prioritized over others, weighted for importance, or any combination thereof.

In some embodiments, a target device that is not necessarily a path agent device can be selected for purposes of pre-processing and/or storing event logs and/or event datasets to the distributed ledger. The target device selecting component 350 can consider any one or more of the determined lowest hop count, available CPU bandwidth, available storage space, or idle state, among other things, when selecting the target device from the plurality of path agent devices in the neighborhood of agent device 310. As the determined capabilities of each agent device, such as agent device 310, is included in each corresponding connectivity configuration, the target device selecting component 350 can select any one of the agent devices in the neighborhood as the target device based on any combination of hop count, available CPU bandwidth, available storage space, idle state (i.e., the other agent device is idle), or any other determined capability of an agent device defined in the associated neighborhood map. As noted above, optimization and efficiency can be facilitated by selecting, for instance, an agent device that is idle (e.g., not currently in use) and/or has a comparatively large amount of storage space or processing bandwidth (e.g., compared to other agent devices). Similar to the foregoing described embodiment, it is contemplated that any of the foregoing capabilities can be prioritized over others, weighted for importance, or any combination thereof.

In some embodiments, an event dataset handling component 355 of agent device 310 can communicate (e.g., send) a generated event dataset to a selected target device, such as one selected by target device selecting component 350. In some further embodiments, the event dataset handling component 355 can receive a generated event dataset from another agent device having selected agent device 310 as its target device. As such, based on receiving an event dataset from another agent device, event dataset handling component 355 can relay the received event dataset to a selected target device, such as the one selected by target device selecting component 350. As any agent device in the network, such as agent device 310, can perform the above-described features of the agent device 310, an event dataset can optimally and efficiently be relayed through a network, without or without segmentation, such that the event dataset is ultimately exfiltrated from the network to a remote server device (e.g., remote server device 250 of FIG. 2) for storage and/or further analysis thereby.

In some embodiments, the event dataset handling component 355 of agent device 310 can generate and communicate an acknowledgement message to another agent device based on a receipt of an event dataset from the other agent device. Similarly, the event dataset handling component 355 of agent device 310 can receive an acknowledgement message from a target device based on a communication of the event dataset thereto. As such, in some further embodiments, the event dataset handling component 355 can delete one or more portions of electronic information relevant to the event dataset (or in other words, the detected suspect event) from its memory based on receipt of such an acknowledgement message. In some aspects, the electronic information deleted can include the event dataset that was communicated to the target device, the stored analytical output data associated with the detected suspect event, the second set of generated event logs, or any combination thereof. In some other embodiments, the event dataset handling component 355 can cause any of the foregoing one or more portions of electronic information to be deleted from the distributed ledger based on receipt of an acknowledgement message received from a remote server device (e.g., remote server device 250 of FIG. 2). In essence, based on the remote server device confirming receipt of the event dataset from an agent device (e.g., a gateway agent device), the event dataset handling component 355 can cause the agent device and other agent devices maintaining the distributed ledger to delete the electronic information. In essence, an acknowledgement message received from the remote server device can be broadcast by each agent device to other agent devices, to cause the electronic information associated with the acknowledgement message to be deleted from a corresponding memory and/or the distributed ledger.

In some embodiments, a distributed ledger node component 360 can facilitate the collective maintenance and storage of a distributed ledger, such as a blockchain, so long as a plurality of agent devices, like agent device 310, is in the network or neighborhood of the agent device 310. In accordance with some embodiments, a distributed ledger can be collectively maintained by a network (e.g., a distributed ledger network) of nodes, such as a plurality of agent devices having a corresponding distributed ledger node component 360. In accordance with some embodiments, the operation of "storing" any piece or type of electronic data (e.g., event logs, analytical output data, templates, behavioral rules, identifiers, connectivity configurations, neighborhood maps, event datasets) by an agent device, such as agent device 310, can be facilitated by distributed ledger node component 360. In some embodiments, any portion of electronic data that is generated, communicated to, and/or received by distributed ledger node component 360 can be encrypted at any time (e.g., before the communication, after it is received).

In some embodiments, and preferably for some public blockchain implementations, each agent device in the distributed ledger network can generally operate as a peer to every other agent device for purposes of maintaining a distributed ledger, such as a blockchain, such that no single agent device is more influential or powerful than any other agent device for purposes of maintaining the distributed ledger. Operations performed by agent devices, or the corresponding distributed ledger node component 360 thereof, can include, among other things, sending and receiving transactions (e.g., any portion of electronic data to be stored on a distributed ledger), validating transactions, verifying blocks of transactions, and adding transactions to an immutable ledger (e.g., blockchain) that is collectively maintained by the agent devices, a copy of which is respectively stored in a memory of each agent device. It is contemplated, however, that in some embodiments, as may be more common in private or enterprise blockchain implementations, any or all agent devices can be specifically designated to perform essential distributed ledger maintenance operations (e.g., validating, verifying, block generation).

In some embodiments, the distributed ledger collectively maintained by the agent devices can store thereon a plurality of electronic transactions (each including electronic data), such as any piece or type of electronic data, which when stored to the distributed ledger, may be immutable by virtue of the distributed nature of the distributed ledger network, applied cryptography concepts, and a consensus ruleset that is independently enforced by each of nodes. However, in some implementations, a distributed ledger in an enterprise (e.g., private) environment may have features for removing or deleting transactions from the distributed ledger based on a consensus of the agent devices, as will be described.

In a traditional distributed ledger network (e.g., a public blockchain network), any agent device can generate a transaction to be added to the distributed ledger. However, in a privileged or private distributed ledger network, only a certain one or more agent devices given designated privileges can generate a transaction to be added to the distributed ledger. As such, the distributed ledger node component 360 of an agent device, such as agent device 310, can include a consensus component (not shown) that includes a processor-enforced consensus ruleset, whereby a transaction can only be added to the distributed ledger based on a determination that a consensus (e.g., a majority, a super majority, unanimity, predefined number, each defined in accordance with the consensus ruleset) of the agent devices in the network or neighborhood of the agent device has collectively validated the transaction. In this regard, while each agent device can independently receive transactions and store a copy of the distributed ledger including the transactions, in a corresponding memory, a transaction can only be added to the distributed ledger when a consensus to add the transaction, as defined by the consensus ruleset, has been determined reached by the agent devices of the distributed ledger network.

In some embodiments, validation of a transaction can be facilitated utilizing features of asymmetric key cryptography (i.e., public-private key pairs), among other validation techniques. In some aspects, as is commonly known in public blockchain implementations (e.g., Bitcoin, Ethereum), a private key can be employed to generate one or more associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital signature generated by an associated private key.

In various embodiments, a transaction generated by the distributed ledger node component 360 of an agent device, such as agent device 310, can be communicated from the agent device to one or more other agent devices of the distributed ledger network. In other words, a transaction received by the distributed ledger node component 360 of agent device 310 can be passed on to one or more other agent devices of the distributed ledger network. In some aspects, the one or more other agent devices can be within the neighborhood of the agent device 310. Similarly, the distributed ledger node component of any other agent device can pass on the received transaction to yet another distributed ledger node component 360 of another agent device of the distributed ledger network (or other agent devices in its corresponding neighborhood). In this regard, a transaction communicated from one agent device to another agent device of the distributed ledger network can be passed on to other agent devices until the transaction has propagated throughout the entire distributed ledger network. In some embodiments, however, a transaction is not finalized (i.e., added to the distributed ledger), or in some instances deleted (i.e., removed from the distributed ledger) until the transaction (or a request to delete a transaction) is validated by a consensus of agent devices in the distributed ledger network, as defined by the consensus ruleset enforced by the distributed ledger node component 360 of each agent device, such as agent device 310.

In some embodiments, the distributed ledger node component 360 of agent device 310 can validate a received transaction or request to delete a transaction based on a determination that the transaction or request has been digitally signed by a known or authorized private key, such as one associated with a privileged agent device, or one associated with an authorized user account, by way of example. In some aspects, each agent device of the distributed ledger network can determine that a transaction or request was digitally signed with a private key associated with a privileged agent device based on a provided or identified public key of the privileged agent device. In some implementations, a public key of the privileged agent device can be defined in each consensus component, or can be defined on the distributed ledger to be easily determined by any agent device, such as agent device 310, of the distributed ledger network. In some other aspects, each distributed ledger node component 360 of an agent device, such as agent device 310, of the distributed ledger network can determine that a transaction or request was digitally signed with a private key associated with an authorized user account based on the public key of each user account being securely shared (e.g., communicated) between the agent devices of the distributed ledger network.

In some embodiments, if a distributed ledger node component 360 of an agent device, such as agent device 310, in the distributed ledger network determines that a transaction or request is not valid (i.e., is not an authorized transaction or request), the transaction or request is determined invalid by the node and the transaction or request is not passed on (e.g., communicated) to other agent devices to which the agent device is in communication with. On the other hand, if a distributed ledger node component 360 of the agent device determines that a transaction or request is valid (i.e., is signed with an authorized key), the agent device can pass on (e.g., communicate) the transaction or request, along with an indication that the distributed ledger node component 360 of the agent device independently validated the transaction or request, to any other agent device in communication therewith. As the agent devices, such as agent device 310, in the distributed ledger network are directly or indirectly connected to one another, this validation process can continue on until the agent devices, whether in the network or neighborhood of the agent device, collectively determine that a consensus of the agent devices, as defined by the consensus ruleset, has validated the transaction or request. In an example, the collective determination of a consensus can be facilitated by virtue of each agent device maintaining a list of other agent devices on the network (e.g., neighborhood map, I.P. address, and/or other identifier) along with their respective determinations of transaction/request validity.

In some embodiments, after a consensus of validity for a transaction or request has been reached by the agent devices, the transaction can be added to the distributed ledger or the request to delete a transaction can be performed by the distributed ledger node component 360 of the agent devices. In some embodiments, a validated transaction must await confirmation before it is added to the distributed ledger. As the agent devices, such as agent device 310, can be peers with one another in accordance with some public blockchain implementations, as described above, any agent device can participate in the process of adding a transaction to or requesting removal of a transaction from the distributed ledger. For purposes of background, a blockchain is a type of distributed ledger that generally includes validated transactions grouped into a cryptographically chained series of blocks, whereby each block includes a subset of these transactions. In some embodiments, any agent device can employ a corresponding distributed ledger node component, such as distributed ledger node component 360, to perform the process of block generation, which can be implemented in a variety of ways (e.g., consensus mechanisms) based on the consensus ruleset enforced by the consensus component including, but not limited to, proof of work, proof of stake, proof of authority, practical Byzantine Fault Tolerance, or Federated Byzantine Agreements. As the aforementioned consensus mechanisms for block generation are generally known in the art, additional detail for these processes are not described herein. It is contemplated, however, that any implementation of block generation and consensus determination can be employed in accordance with some embodiments of the present disclosure. More importantly, as the general outcome of block generation is relatively similar among various implementations, the following description is provided irrespective of the block generation aspect of the consensus component.

In some embodiments, to add a validated transaction to a blockchain, the transaction must first be included into a block that is being generated by one of the agent devices, or its corresponding distributed ledger node component, and subsequently validated by a consensus of the agent devices, or their corresponding distributed ledger node components, in the distributed ledger network. The transaction can be independently included into a block, or grouped together with other transactions, either of which are included within the purview of the present disclosure. Such implementations may vary, however, based on design considerations of the consensus component and/or a block size (i.e., memory limitation) implemented or defined as part of a consensus ruleset enforced by the consensus component of each agent device. In various embodiments, an agent device generating a block must also include, into the block it is generating, a cryptographic hash of the block most-recently added to the blockchain. Once generated in accordance with any consensus rules defined by the consensus component, an agent device generating a block can send the generated block to any of the agent devices to which it is in communication with (e.g., via the network).

In some embodiments, agent devices receiving a generated block can verify that the block includes one or more valid transactions, includes a hash value of a block most-recently added to the blockchain, and that the block was generated in accordance with the defined consensus ruleset. Upon verifying the foregoing, each agent device can pass on (e.g., communicate) the verified block to its neighboring agent device(s), or in other words, one or more agent devices it is communication with via the network. In this way, and similar to how a transaction or request is validated by a determined consensus of the distributed ledger network, a generated block including at least the transaction can be verified by another determined consensus of the agent devices. When a determination is made that a consensus of the agent devices has verified a block, the newly-verified block is added by each of the agent devices, or a corresponding distributed ledger node component, to its respective copy of the blockchain immediately subsequent to a previously-added block, whereby the hash of the previously-added block is included into the newly-verified block. In this regard, each block can be cryptographically "chained" to a previous block and a subsequent block. In other words, the cryptographic hashes can immutably enforce the order and accuracy of transactions stored on the blockchain. In some embodiments, each respective copy of the blockchain maintained by an agent device, such as agent device 310, can be accessed by the agent device, any other agent device, or in some further embodiments, a computing device as described in accordance with FIG. 7. In this regard, the blockchain can be provided as a transparent record of transactions, that can be cross-referenced in a variety of manners, whether for purposes of auditing, verifying, or simply referencing transactions (e.g., electronic data) stored in accordance with the present disclosure.

Figure 4:
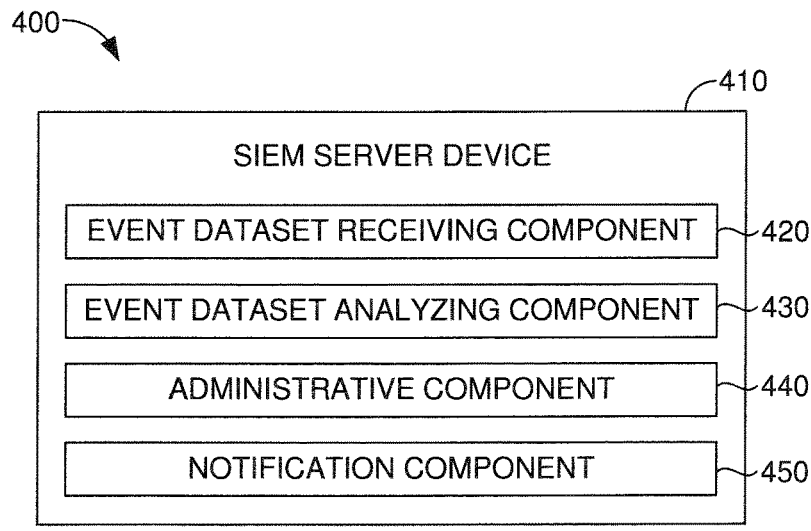
FIG. 4 is a block diagram depicting an exemplary SIEM server device in accordance with some embodiments of the present disclosure.

Turning now to FIG. 4, a block diagram 400 is provided depicting an exemplary SIEM server device 410, such as remote server device 130 of FIG. 1 or remote server device 250 of FIG. 2, in accordance with some embodiments of the present disclosure. In some embodiments, the SIEM server device 410 can include at least one computing device described in accordance with FIG. 7. The SIEM server device 410 can further include, among other things, any one or more of an event dataset receiving component 420, an event dataset analyzing component 430, an administrative component 440, and a notification component 450.

In various embodiments, the SIEM server device 410 can include an event dataset receiving component 420 that receives an event dataset from one or more agent devices that is remote from the SIEM server device 410, such as agent device 110 of FIG. 1, any of agent devices 210A-210H of FIG. 2, or agent device 310 of FIG. 3. The event dataset receiving component 420 can receive the event dataset over an external network (e.g., the Internet), such as external network 240 of FIG. 2, and/or any other network or combination of other networks that is external to a network associated with the one or more agent devices. In some embodiments, the event dataset receiving component 420 can store the received event dataset to a memory of the SIEM server device 410, or a database coupled thereto, among other things.

In some embodiments, the SIEM server device 410 can include an event dataset analyzing component 430 that can extract electronic information (e.g., event logs, analytical output data) from a stored event dataset for analysis. In some embodiments, the event dataset analyzing component 430 can analyze electronic information extracted from the stored event dataset to determine whether an associated suspect event corresponds to an actual threat to the network (i.e., the network associated with the one or more agent devices). In some other embodiments, the event dataset analyzing component 430 can analyze electronic information extracted from the stored event dataset, in view of a historical record (e.g., previously received and now stored electronic information) of an agent device associated with the received electronic information, to determine whether an associated suspect event corresponds to an actual threat to the network (i.e., the network associated with the one or more agent devices). In some aspects, the event dataset analyzing component 430 can generate a machine learning model based on the previously received and stored electronic information to facilitate the determination that an associated suspect event corresponds to an actual threat to the network.

In some embodiments, the SIEM server device 410 can include an administrative component 440 that generates, among other things, a graphical user interface (GUI) that can be provided for display by the SIEM server device 410. It is contemplated that the generated GUI can be accessed directly on the SIEM server device 410, or remotely by a client computing device, such as one described in accordance with FIG. 7. The administrative component 440 can facilitate the generation of output data that can be presented via the GUI, and the receipt of input data that can be received via the GUI.

In some embodiments, the SIEM server device 410 can include a notification component 450 that can generate a notification based on a result generated from the analysis conducted by event dataset analyzing component 430. In some aspects, the notification can indicate that the suspect event associated with the stored event dataset is, in fact, a threat to the network (e.g., a breach, hack, or other undesirable operation performed on the network). In this regard, in some embodiments, the notification component 450 can communicate the generated notification to administrative component 440, so that the notification can be provided for display via the GUI. In some further embodiments, the notification component 450 can communicate the generated notification to one or more defined administrative address(es) (e.g., email address, phone number, messaging account). In some embodiments, the notification component 450 can communicate the generated notification to a gateway agent device, as described in accordance with FIG. 3, so that the gateway agent device can propagate the notification throughout the network, or in some instances, cause one or more agent devices within the network to perform remedial or preventative measures (e.g., lock systems, stop network communications, cease or kill processes), among other things. In some aspects, if the gateway agent device is behind a firewall and cannot receive a notification without a pre-existing connection (e.g., session) between the gateway agent device and SIEM server device 410, the SIEM server device 410 can communicate the notification at a time that the gateway agent device establishes a connection (e.g., session) to the SIEM server device 410 for communicating an event dataset thereto.

While not shown, it is contemplated that in some embodiments, the SIEM server device 410 can include an agent device updating component. Similar to how a notification can be communicated to a gateway agent device (e.g., by notification component 450), updates (e.g., software or firmware revisions) can be communicated to the gateway agent device, as described in accordance with FIG. 3, so that the gateway agent device can propagate the update throughout the network. As noted above, if the gateway agent device is behind a firewall and cannot receive an update without a pre-existing connection (e.g., session) between the gateway agent device and SIEM server device 410, the SIEM server device 410 can communicate the update at a time that the gateway agent device establishes a connection (e.g., session) to the STEM server device 410 for communicating an event dataset thereto.

Figure 5:
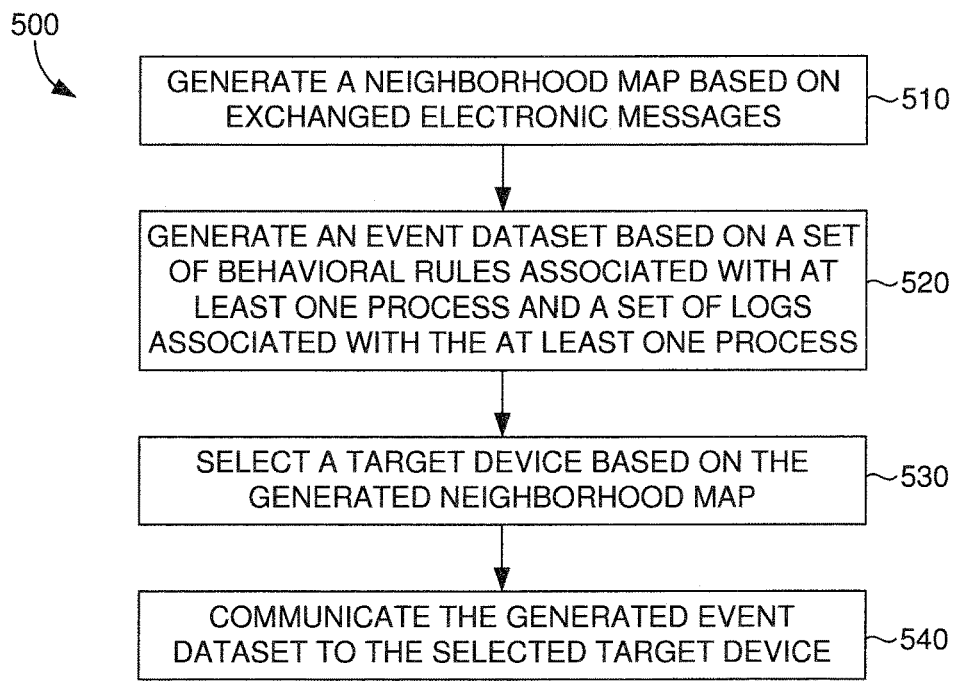
FIG. 5 is a flow diagram showing a method for exfiltrating event data in accordance with some embodiments of the present disclosure.

Turning now to FIG. 5, a flow diagram 500 is provided that illustrates a method for exfiltrating event data from a secured network in accordance with some embodiments of the present disclosure. As described in accordance with FIG. 3, an agent device, such as agent device 310, can automatically determine a set of capabilities associated with the agent device. The agent device can generate a connectivity configuration associated with the agent device based on the determined set of capabilities. The agent device can also exchange a plurality of electronic message broadcasts with one or more other agent device(s) in the network, or a segment of the network associated with the agent device. Each electronic message that is generated and broadcast by an agent device can include an identifier and a generated connectivity configuration associated with the agent device. As such, the agent device can generate (and continue to generate) a connectivity configuration associated with the agent device, dynamically, based on the exchanged plurality of electronic message broadcasts.

In some embodiments, a generated connectivity configuration can include one or more of: a determined result of a performed attempt by the agent device to exfiltrate the network (e.g., access a remote server device), a determined indication that the agent device can communicate with another agent device that can provide a path (i.e., is in a set of other agent devices through which communications can be relayed) to exfiltrate the network, and a determined number of hops (e.g., within the network) required to exfiltrate the network (e.g., if the agent device was to serve as a relay in a corresponding path).

As such, at block 510, a neighborhood map associated with the agent device can be generated (or continuously generated) based on the connectivity configuration(s) of the one or more other agent devices included in a portion of the exchanged electronic message broadcasts received by the agent device. In some aspects, the generated neighborhood map includes a set of identifiers, each identifier being associated with another agent device with which one or more electronic message broadcasts were exchanged, and the connectivity configuration associated with the other agent device.

In various embodiments, the agent device can generate a plurality of event logs (e.g., event data) associated with one or more processes and/or applications executing thereon. In some embodiments, the generated plurality of event logs can be stored in a memory of the agent device. In some further embodiments, the agent device can store the generated plurality of event logs, with an identifier associated with the agent device, onto a distributed ledger (e.g., a blockchain) collectively maintained and stored by each of the agent device and any one or more other agent device(s) within the network and/or the generated neighborhood map.

In some embodiments, the agent device can determine behavioral patterns of one or more processes and/or applications executed or executing on the agent device based on an analysis of the stored event logs. In some instances, the agent device can communicate event logs and/or determined behavioral patterns to other agent device(s) within the network and/or generated neighborhood map. In some other embodiments, the agent device can determine behavioral patterns of one or more processes and/or applications executed or executing on another agent device associated with the stored event logs based on an analysis of the stored event logs. That is, the agent device can receive one or more event logs from another agent device, so that the agent device can determine behavioral patterns for the other agent device based on the received event log(s). In various embodiments, the agent device can generate a set of behavioral pattern rules that define, in essence, a pattern of normal behavior of the agent device (e.g., the processes or applications thereof), or other agent device associated with the analyzed event logs, based on the determined behavioral patterns. In this way, the agent device can detect a suspect event (i.e., an abnormal behavior) utilizing additional event logs generated by the agent device, or other agent device, based on the generated set of behavioral pattern rules. The agent device can analyze the stored additional event logs against the stored set of behavioral pattern rules to detect the occurrence of a suspect event. In some aspects, performance of the analysis can cause the generation of analysis output data associated with the agent device to be stored in the memory and/or on the distributed ledger.

At block 520, based on the agent device detecting a suspect event, the agent device can generate an event dataset associated with the detected suspect event. In some embodiments, the agent device can compress the additional event logs to extract therefrom one or more event logs that are relevant to the detected suspect event. In some aspects, the one or more relevant event logs can be compressed based on, for instance, a determined relevance thereof to the detected suspect event and/or a defined template associated with the one or more processes, applications, or the agent device identifier, among other things. In some further aspects, the defined template can be stored in the memory of each agent device, or stored in the distributed ledger maintained by each agent device. In even further aspects, the stored analysis output data can be compressed based on a determined relevance thereof to the detected suspect event. In some embodiments, the agent device can compress the event log(s) and/or the analysis output data associated with the detected suspect event utilizing a variety of techniques (e.g., parsing, compressing, trimming, relevance determining) to generate the event dataset associated with the detected suspect event.

At block 530, the agent device can select at least one target device from a group consisting of a remote server device, such as SIEM server device 410 of FIG. 4, and a set of other agent devices defined a neighborhood map associated with the agent device. The at least one target device can be selected as a recipient of the generated event dataset based on the connectivity configuration associated with the agent device and/or the connectivity configurations associated with the other agent device(s) in the generated neighborhood map. For instance, based on a determination that the connectivity configuration associated with the agent device indicates that the agent device can exfiltrate the network, the agent device can select the remote server device as a target device. In another instance, based on a determination that the connectivity configuration associated with the agent device indicates that the agent device cannot exfiltrate the network, but that one or more of the other agent devices in the neighborhood map can provide a path to exfiltrate the network, the agent device can select as a target device one of the agent devices, which can both provide the path and is associated with a lowest determined hop count. In some embodiments, additional factors, such as available CPU bandwidth, available storage space, or idle state, associated with the other agent devices in the neighborhood map can be considered in addition or as an alternative to the lowest determined hop count for selecting a target device.

At block 540, the agent device can communicate the generated event dataset to the selected at least one target device. As each other agent device in the network can perform any portion of the above-recited steps of the agent device, any agent device in the network that is selected as a target device can receive and further communicate (i.e., relay) the event dataset to a corresponding selected target device until the event dataset is ultimately communicated to the remote server device for storage and/or further analysis thereby.

In some embodiments, the agent device can generate and communicate an acknowledgement message to another agent device based on a receipt of an event dataset from the other agent device. Similarly, the agent device can receive an acknowledgement message from a target device based on a communication of the event dataset thereto. As such, in some further embodiments, the agent device can delete one or more portions of electronic information relevant to the event dataset (or in other words, the detected suspect event) from its memory based on receipt of such an acknowledgement message. In some aspects, the electronic information deleted can include the event dataset that was communicated to the target device, the stored analytical output data associated with the detected suspect event, the second set of generated event logs, or any combination thereof. In some other embodiments, the agent device can cause any of the foregoing one or more portions of electronic information to be deleted from the distributed ledger based on receipt of an acknowledgement message received from the remote server device. In essence, based on the remote server device confirming receipt of the event dataset from one or more agent devices in the network, the agent device and other agent devices maintaining the distributed ledger can responsively delete the associated electronic information.

Figure 6:
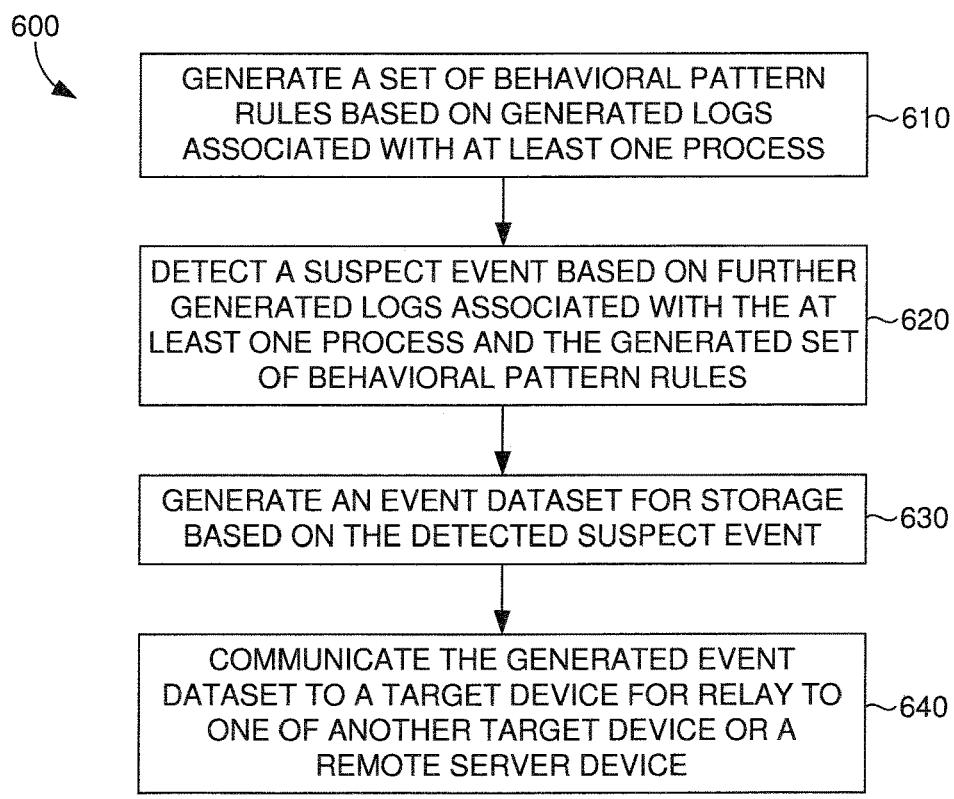
FIG. 6 is a flow diagram showing a method for exfiltrating event data in accordance with some embodiments of the present disclosure.

Referring now to FIG. 6, a flow diagram 600 is provided that illustrates a method for exfiltrating event data from a secured network in accordance with some embodiments of the present disclosure. As described in accordance with FIG. 3 and the method of FIG. 6, an agent device can generate a connectivity configuration associated with the agent device based on a determined set of capabilities. The agent device can also generate (and continue to generate) a connectivity configuration associated with the agent device, dynamically, based on an exchanged plurality of electronic message broadcasts. In addition, the agent device can generate (and continue to generate) a neighborhood map associated with the agent device based on the connectivity configuration(s) of the one or more other agent devices included in a portion of the exchanged electronic message broadcasts received by the agent device.

The agent device can generate a plurality of event logs (e.g., event data) associated with one or more processes and/or applications executing thereon. In some embodiments, the generated plurality of event logs can be stored in a memory of the agent device. In some further embodiments, the agent device can store the generated plurality of event logs, with an identifier associated with the agent device, onto a distributed ledger (e.g., a blockchain) collectively maintained and stored by each of the agent device and any one or more other agent device(s) within the network and/or associated with the generated neighborhood map.

The agent device can determine behavioral patterns of one or more processes and/or applications executed or executing on the agent device based on an analysis of the stored event logs. In some other embodiments, the agent device can determine behavioral patterns of one or more processes and/or applications executed or executing on another agent device associated with the stored event logs based on an analysis of the stored event logs. Thus, at block 610, the agent device can generate a set of behavioral pattern rules that define, in essence, a pattern of normal behavior of the agent device (e.g., the processes or applications thereof), or other agent device associated with the analyzed event logs, based on the determined behavioral patterns. In this way, the agent device can detect, at block 620, a suspect event (i.e., an abnormal behavior) utilizing additional event logs generated by the agent device, or other agent device, based on the generated set of behavioral pattern rules. The agent device can analyze the stored additional event logs against the stored set of behavioral pattern rules to detect the occurrence of a suspect event. In some aspects, performance of the analysis can cause the generation of analysis output data associated with the agent device to be stored in the memory and/or on the distributed ledger.

At block 630, based on the agent device detecting a suspect event, the agent device can generate an event dataset associated with the detected suspect event. In some embodiments, the agent device can compress the additional event logs to extract therefrom one or more event logs that are relevant to the detected suspect event. In some aspects, the one or more relevant event logs can be compressed based on, for instance, a determined relevance thereof to the detected suspect event and/or a defined template associated with the one or more processes, applications, or the agent device identifier, among other things. In some further aspects, the defined template can be stored in the memory of each agent device, or stored in the distributed ledger maintained by each agent device. In even further aspects, the stored analysis output data can be compressed based on a determined relevance thereof to the detected suspect event. In some embodiments, the agent device can compress the event log(s) and/or the analysis output data associated with the detected suspect event utilizing a variety of techniques (e.g., parsing, compressing, trimming, relevance determining) to generate the event dataset associated with the detected suspect event.

The agent device can select at least one target device from a group consisting of a remote server device, such as SIEM server device 410 of FIG. 4, and a set of other agent devices defined a neighborhood map associated with the agent device. The at least one target device can be selected as a recipient of the generated event dataset based on the connectivity configuration associated with the agent device and/or the connectivity configurations associated with the other agent device(s) in the generated neighborhood map. For instance, based on a determination that the connectivity configuration associated with the agent device indicates that the agent device can exfiltrate the network, the agent device can select the remote server device as a target device. In another instance, based on a determination that the connectivity configuration associated with the agent device indicates that the agent device cannot exfiltrate the network, but that one or more of the other agent devices in the neighborhood map can provide a path to exfiltrate the network, the agent device can select as a target device one of the agent devices, which can both provide the path and is associated with a lowest determined hop count. In some embodiments, additional factors, such as available CPU bandwidth, available storage space, or idle state, associated with the other agent devices in the neighborhood map can be considered in addition or as an alternative to the lowest determined hop count for selecting a target device.

The agent device can communicate the generated event dataset to the selected at least one target device. As each other agent device in the network can perform any portion of the above-recited steps of the agent device, any agent device in the network that is selected as a target device can receive and further communicate (i.e., relay) the event dataset to a corresponding selected target device until the event dataset is ultimately communicated to the remote server device for storage and/or further analysis thereby.

In some embodiments, the agent device can generate and communicate an acknowledgement message to another agent device based on a receipt of an event dataset from the other agent device. Similarly, the agent device can receive an acknowledgement message from a target device based on a communication of the event dataset thereto. As such, in some further embodiments, the agent device can delete one or more portions of electronic information relevant to the event dataset (or in other words, the detected suspect event) from its memory based on receipt of such an acknowledgement message. In some aspects, the electronic information deleted can include the event dataset that was communicated to the target device, the stored analytical output data associated with the detected suspect event, the second set of generated event logs, or any combination thereof. In some other embodiments, the agent device can cause any of the foregoing one or more portions of electronic information to be deleted from the distributed ledger based on receipt of an acknowledgement message received from the remote server device. In essence, based on the remote server device confirming receipt of the event dataset from one or more agent devices in the network, the agent device and other agent devices maintaining the distributed ledger can responsively delete the associated electronic information.

Having described embodiments of the present disclosure, an exemplary operating environment in which embodiments of the present disclosure may be implemented is described below in order to provide a general context for various aspects of the present disclosure. Referring initially to FIG. 7 in particular, an exemplary operating environment for implementing embodiments of the present disclosure is shown and designated generally as computing device 700. Computing device 700 is but one example of a suitable computing environment and is not intended to suggest any limitation as to the scope of use or functionality of the described embodiments. Neither should the computing device 700 be interpreted as having any dependency or requirement relating to any one or combination of components illustrated.

The various embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The various embodiments may be practiced in a variety of system configurations, including hand-held devices, consumer electronics, general-purpose computers, more specialty computing devices, etc. The various embodiments may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present disclosure provide for, among other things, exfiltrating event data from within a secured network, whether the network is segmented or unsegmented. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that the described embodiments are one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter described in the present disclosure is provided with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method for exfiltrating event data from within a network, the method performed by a first computing device of a plurality of computing devices within the network, and the method comprising:
   generating, by the first computing device, each of a connectivity configuration and a neighborhood map based at least in part on
   at least one electronic message received from at least a second computing device of the plurality of computing devices, the at least one electronic message being responsive to at least one broadcast to the network from the first computing device, and
   an automated attempt by the first computing device to directly access a remote server device outside the network;
   obtaining, by the first computing device, a behavioral rule and a log that are each associated with a process of the second computing device;
   based on the behavioral rule and the log, detecting, by the first computing device, a suspect event associated with the process;
   selecting, by the first computing device, the second computing device as a target device based on the generated connectivity configuration and the generated neighborhood map, the target device being selected from a group consisting of the remote server device and the plurality of computing devices;
   generating, by the first computing device, an event dataset associated with the detected suspect event; and
   communicating, by the first computing device, the generated event dataset to the selected target device.

2. The method of claim 1, the method further comprising:
   storing, by the first computing device, the generated event dataset to a memory of the first computing device;
   receiving, by the first computing device, an electronic acknowledgement message from the selected target device based on the generated event dataset communicated thereto; and
   deleting, by the first computing device, the stored event dataset from the memory based on the received electronic acknowledgement message.

3. The method of claim 1, further comprising:
   receiving, by the first computing device, the log from one of the plurality of computing devices.

4. The method of claim 1, wherein
   each of the connectivity configuration and the neighborhood map is generated by the first computing device based further in part on determining at least one capability of the first computing device, the determining based on
   an amount of free CPU bandwidth of the first computing device,
   an amount of free storage space of the first computing device, and
   a detected idle state of the first computing device.

5. The method of claim 1, further comprising:
   receiving, by the first computing device, another log associated with the process from the second computing device; and
   determining, by the first computing device, the behavioral pattern rule based at least in part on the received other log.

6. The method of claim 1, further comprising:
   receiving, by the first computing device, the behavioral pattern rule from the second computing device, wherein the second computing device is configured to determine the behavioral pattern rule based at least in part on another log associated with the process.

7. The method of claim 1, further comprising:
receiving, by the first computing device, the behavioral pattern rule from a third computing device of the plurality of computing devices, wherein the second computing device is configured to communicate another log associated with the process to the third computing device, and the third computing device is configured to determine the behavioral pattern rule based at least in part on the communicated other log.

8. The method of claim 1, wherein the generated event dataset includes the log.

9. The method of claim 8, further comprising:
selecting, by the first computing device, the log for inclusion into the event dataset based on a predefined template associated with the process.

10. The method of claim 1, wherein the event dataset is generated based at least in part on the target device being selected.

11. The method of claim 1, wherein each electronic message of the received at least one electronic message is broadcast by a corresponding one of the plurality of computing devices, the electronic message including a corresponding connectivity configuration of the corresponding computing device from which the electronic message was broadcasted.

12. The method of claim 11, wherein the corresponding connectivity configuration includes a corresponding result of a corresponding performed attempt to directly access the remote server device.

13. The method of claim 12, wherein the corresponding connectivity configuration includes a corresponding at least one determined capability of the corresponding computing device.

14. A computer storage medium storing computer-useable instructions that, when used by at least one processor of a first computing device of a plurality of computing devices in a network, cause the at least one processor to perform operations comprising:
generating a neighborhood map based at least in part on at least one electronic message received from a second computing device of the plurality of computing devices, each electronic message of the at least one electronic message being received in response to at least one broadcast to the network from the first computing device and including a corresponding connectivity configuration associated with the second computing device;
detecting a suspect event based at least in part on a defined behavioral pattern rule associated with a process and a log generated via the process;
generating an event data set associated with the detected suspect event; and
communicating the generated event dataset to the second computing device selected as a target device based on the generated neighborhood map and the corresponding connectivity configuration, wherein the second computing device is configured to generate a corresponding neighborhood map based at least in part on the at least one broadcast and relay the communicated event dataset to one of a remote server device outside of the network or a third computing device of the plurality of computing devices based on the generated corresponding neighborhood map.

15. The medium of claim 14, the operations further comprising:
selecting the log for inclusion into the event dataset based at least in part on a predefined template associated with the process.

16. The medium of claim 14, the operations further comprising:
receiving the defined behavioral pattern rule and the log from the second computing device, wherein the process is executing on the second computing device.

17. The medium of claim 14, the operations further comprising:
receiving an electronic acknowledgement message from the second computing device; and
deleting the generated event dataset from a memory of the first computing device based on the received electronic acknowledgement message.

18. The medium of claim 14, the operations further comprising:
attempting to directly access the remote server device; and
generating the corresponding connectivity configuration associated with the first computing device based at least in part on the attempt.

19. A computerized system comprising:
a connectivity determining means for generating a connectivity configuration and a neighborhood map for a first computing device in a network based at least in part on at least one electronic message received from a second computing device in the network, and a performed attempt by each of the first computing device and the second computing device to directly access a remote server device outside the network, wherein the at least one electronic message is received in response to at least one broadcast to the network from the first computing device;
a behavioral pattern rule defining means for generating a behavioral pattern rule associated with a process executing on the second computing device based on a first log associated with the executing process and received from the second computing device;
a target selecting means for selecting the second computing device as a target device based on the generated connectivity configuration and neighborhood map;
an event dataset generating means for generating an event dataset associated with the executing process based on a suspect event that is detected based on the generated behavioral pattern rule and a second log, associated with the executing process, and received from the second computing device; and
a transmission means for communicating the generated event dataset to the selected target device.

20. The computerized system of claim 19, wherein the connectivity configuration is generated based further in part on a capability associated with the first computing device, the capability corresponding to one of a determined amount of free CPU bandwidth, a determined amount of free storage space, and an idle state.

* * * * *